United States Patent

[11] 3,627,999

[72] Inventor Gary J. Iverson
White Bear Lake, Minn.
[21] Appl. No. 880,653
[22] Filed Nov. 28, 1969
[45] Patented Dec. 14, 1971
[73] Assignee Comcet Incorporated
St. Paul, Minn.

[54] TWO'S COMPLEMENT NEGATIVE NUMBER MULTIPLYING CIRCUIT
3 Claims, 3 Drawing Figs.

[52] U.S. Cl. .......... 235/164, 235/156
[51] Int. Cl. .......... G06f 7/38, G06f 7/39
[50] Field of Search .......... 235/164, 165, 166, 167, 156

[56] References Cited

OTHER REFERENCES

R. K. Richards, Arithmetic Operations In Digital Computers, Van Nostrand, 1955, pp. 161–165
Y. Chu, Digital Computer Design Fundamentals, McGraw-Hill, 1962, pp. 27–35
Liu & M. W. Bee, " Multiplication Using 2' s Complement Numbers," IBM Technical Disclosure Bulletin, Vol. 9, No. 2, 1966, pp. 171–173

*Primary Examiner*—Malcolm A. Morrison
*Assistant Examiner*—James F. Gottman
*Attorney*—Alfred E. Hall

ABSTRACT: A two's complement negative number multiplying circuit in which no complementing of the multiplier or multiplicand is required, no special cases need be detected, no complementing of the result is required and fewer transfer paths are needed.

| Md | Mr | K ≠ n | K = n |
|---|---|---|---|
| + | + | 0 | 0 |
| + | − | 0 | $B_0$ |
| − | + | EOC + $B_0$ | EOC + $B_0$ |
| − | − | EOC + $B_0$ | 0 |

INVENTOR.
GARY J. IVERSON
BY Alfred E Hall
ATTORNEY

INVENTOR
GARY J. IVERSON
BY Alfred E Hall
ATTORNEY

TWO'S COMPLEMENT NEGATIVE NUMBER MULTIPLYING CIRCUIT

BACKGROUND OF THE INVENTION

In the prior art, multiplying negative numbers in the two's complement system requires that all negative numbers be complemented, then multiplied and the result complemented and "one" added to that. However, when multiplying two "$n$-bit" numbers, the result is $2n$ bits in length. This means that to complement the result, either a double-length adder must be used which is quite costly or the operation must be performed in a serial manner which requires more data paths and extra time.

SUMMARY

The present invention is a two's complement multiplier circuit which utilizes a single-length adder to perform the same function as would be required with a double-length adder in the prior art unless the operation were performed in a serial manner requiring more data paths and extra time. Thus the present system saves time and/or money.

Further, in the prior art when multiplying in the two's complement system, a situation can occur wherein an initial value is complemented and "one" added thereto and the result equals the initial value. For example, 100 complemented is 011. When 1 is added thereto, 100 is obtained again. This is a special condition which must be detected in the prior art.

In the present invention, this situation cannot occur because initial complementation sequences are not required and thus, "one" is never added to a complemented value and, therefore, no circuits are necessary to detect this special condition.

Thus it is an object of the present invention to provide a two's complement negative number multiplying circuit which does not require extra time in order to perform the operation because there are no initialization and termination complementation sequences.

It is also an object of the present invention to provide a two's complement negative number multiplying circuit which does not complement the result and add "1" therefore avoiding the special case which must be detected in the prior art where the complemented value plus "1" equals the initial value.

It is still a further object of the present invention to provide a two's complement negative number multiplying circuit which saves transfer paths or logic circuits to perform the complementation of the double-word product as required by the prior art.

BRIEF DESCRIPTION OF THE DRAWINGS

These and other more detailed and specific objectives will be disclosed in the course of the following specification, reference being had to the accompanying drawings in which.

Figures 1, 3:
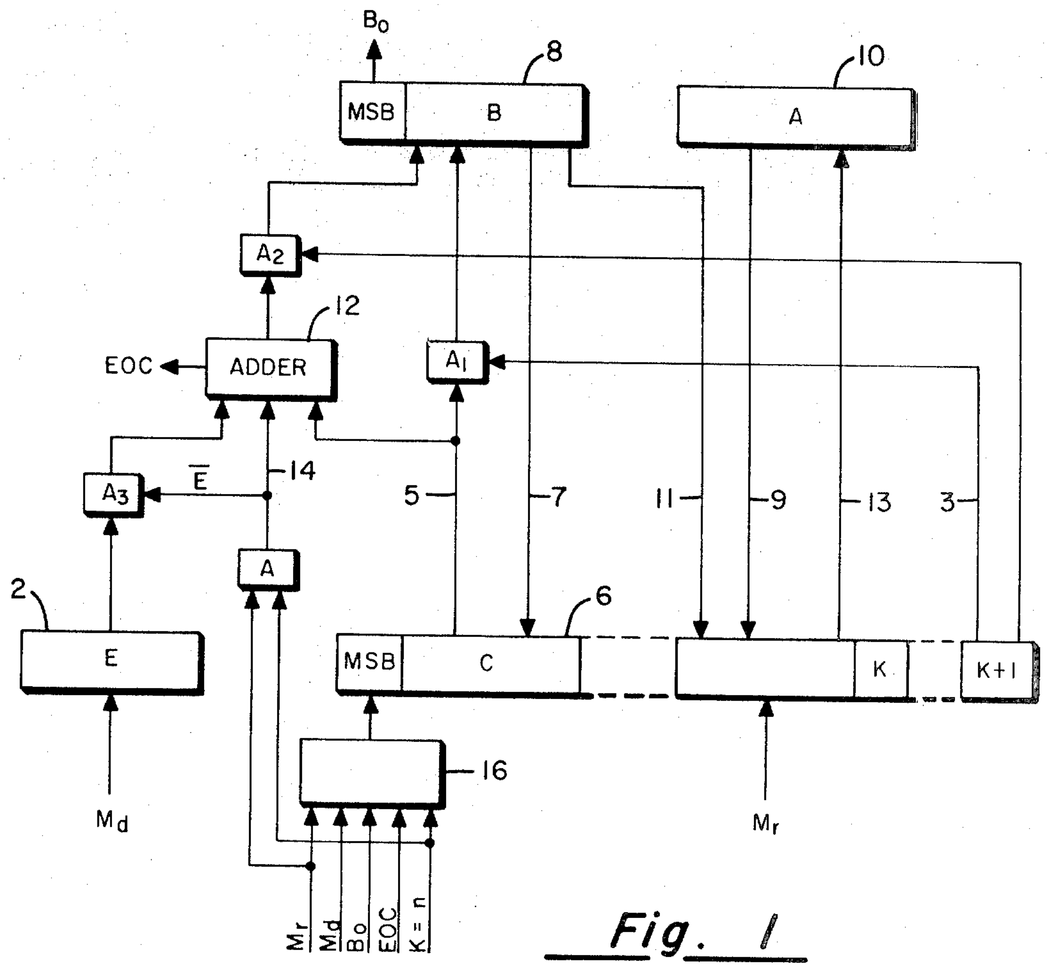
FIG. 1 discloses a block diagram of the preferred embodiment of the present invention.
FIG. 3 is a truth table illustrating the conditions under which a bit is forced into the most significant stage of the C-register by the circuit shown in FIG. 2.

Binary computer multiplication is a rather simple operation. Multiplication is performed by a sequence of adds and shifts or shifts alone. Addition takes place one character or bit at a time. The multiplier is examined sequentially from one end to the other, bit by bit; if the examined bit is a 1, an add and a shift occur; if the examined bit is a zero, only the shift occurs.

Multiplication using positive operands presents no problem and the process is carried out in a straightforward manner as explained. Negative operands, however, as represented in a computer, present problems and require corrections.

Consider first the case of a negative multiplicand and a positive multiplier. Here, negative numbers are merely being summed. Thus, as the partial product is being formed, the sign must be maintained. First observations indicate that this is easily accomplished by unconditionally inserting the sign (the MSB) of the multiplicand into the partial product register every time the partial product is shifted to the right. However, this process works only if the first examined multiplier bit is a "1." This occurs because, basically, with a positive multiplier and a negative multiplicand, the multiplication process is the summation of negative numbers, and the partial products must be maintained as negative. Therefore, insertion of the sign bit of the multiplicand into the MSB stage of the Partial Product Register introduces an error if no "1" is detected in the multiplier bit position being examined.

Thus the insertion of a "1" bit into the most significant bit state of the partial product register to maintain the sign should occur only after detection of the first "1" in the multiplier bit position being examined or an error will occur as shown in example 1. The correct method is shown in example 2.

Example 1 Unconditional insertion of "1" into the MSB stage of the partial product register (PPR) at first shift time where initial bits in the PPR are all "0's."

| | | |
|---|---|---|
| 110 | | $M_d$ (−2). |
| 010 | | $M_r$ (2). |
| 100 | 0 | Shift bits in PPR one place and insert "1" in MSB stage thereof (examine "0" in first $M_r$ bit position). |
| 110 | 0 | Add $M_d$ (examine "1" in second $M_r$ bit position). |
| 010 | 0 | Resulting partial product. |
| 101 | 00 | Shift bits and PPR one more place and insert "1" in MSB stage. |
| 110 | 00 | Add $M_d$ (examine "0" in third $M_r$ bit position). |
| 011 | 00 | Resulting partial product. |
| 101 | 100 | Shift bits and PPR one more place and insert "1" in MSB stage. |
| | | Incorrect result (≠−4). |

Example 2 Insertion of "1" into MSB stage of the partial product register only after detection of the first "1" in the multiplier and thereafter maintaining it where the initial bits in the PPR are all "0's."

| | | |
|---|---|---|
| 110 | | $M_d$ (−2). |
| 010 | | $M_r$ (2). |
| 000 | 0 | Shift bits and PPR one place (examine "0" in first $M_r$ bit position). |
| 110 | 0 | Add $M_d$ (examine "1" in second $M_r$ bit position). |
| 110 | 0 | Resulting partial product. |
| 111 | 00 | Shift bits in PPR one more place and insert "1" in MSB stage. |
| 111 | 100 | Shift bits in PPR one more place and insert "1" (examine "0" in the third $M_r$ bit position). |
| | | Correct result (=−4). |

Next, consider a negative multiplier and a positive multiplicand. Any number $X$ can be represented digitally by a series of $n$ digits $X$, $X_{n-1}$, $X_{n-2}$ . . . to the base $r$ as follows:

$$X=r^nX_n+r^nX_{n-1}+ \ldots +r^2X^2+R^1X_1+r^oX_o$$

Any digital number with a magnitude $X$ is represented in a machine as a two's complement negative number in its complemented form by $r^{n+1}-X$ where $n$ = the highest order stage of the register in which the complemented number is to be stored.

Straight forward multiplication of a negative multiplier $X$ and a positive multiplicand $Y$ will give the following result.

$$XY=(r^{n+1}-X)\ Y=r^{n+1}\ Y-XY$$

Since the result being sought is $-XY$, this result is obviously too large by $r^{n+1}\ Y$ and this amount must be subtracted out from the result obtained by a straightforward calculation.

The most significant digit for a negative number in the two's complement system is always a "1" or, written generally, $r-10$ where $r$ = the base of the number system. In straightforward calculations in the base 2 system, the multiplicand is multiplied by this digit (1) to obtain (1)$Y$ which is still the multiplicand, and this result is added to the partial product. In other words, whenever a "1" is detected in the $M_r$ bit position being examined, the $M_d$ is added to the partial product. Obviously, the partial product for the $n$th partial add will increase the partial product by $(r-1)r^nY$. Thus, $(r-1)r^nY=r^{n+1}Y-r^nY$.

Before the $n$th addition of the product of the sign digit (MSB) and the multiplicand to the partial product, the partial product is $$(r^{n+1}Y-XY)-(r^{n+1}Y-r^{n}Y)=r^{n}Y-XY$$

Therefore, subtraction of $r^nY$ at the $n$th or last partial add time results in the final product of $XY$. By injecting a "1" in the MSB position of the PPR after shifting to indicate a negative number, the desired result, $(-XY)$, is obtained.

Consider the following example. Basically this case is summation of positive numbers and zeros are always inserted in the MSB on the partial product shift except on the last shift at which time a "1" is inserted to indicate a negative product.

EXAMPLE 3

Subtracting the $M_d$ from the partial product register after $n-1$ shifts where $n$ = the number of bits in the multiplier and inserting a "1" in the MSB of the partial product register only after the subtraction and last shift.

| | | |
|---|---|---|
| 010 | | $M_d$ (2). |
| 110 | | $M_r$ (−2). |
| 000 | 0 | Shift bits in PPR one place (examine "0" in first $M_r$ bit position). |
| 010 | 0 | Add $M_d$ (examine "1" in second $M_r$ bit position). |
| 010 | 0 | Resulting partial product. |
| 001 | 00 | Shift bits in PPR one more place. |
| 010 | 00 | Subtract $M_d$ (examine "1" in third or nth $M_r$ bit position). |
| 111 | 00 | Remainder. |
| 111 | 100 | Shift bits in PPR one more place and insert "1" in MSB. Correct result (=−4). |

Here, as shown in example 4, the insertion of a "1" bit into the MSB of the partial product register after each shift to maintain the sign will cause an error. The "1" is to be inserted into the MSB of the partial product register only after the $M_d$ is subtracted on the last iteration and shifted.

EXAMPLE 4

| | | |
|---|---|---|
| 010 | | $M_d$ (2). |
| 110 | | $M_r$ (−2). |
| 100 | 0 | Shift bits in PPR 1 and insert '1'" (improper step). |
| 010 | 0 | Add $M_d$. |
| 110 | 0 | Resulting partial product. |
| 111 | 00 | Shift bits in PPR one place and insert "1" in MSB. |
| 010 | 00 | Subtract $M_d$ (last iteration). |
| 101 | 00 | Remainder. |
| 110 | 100 | Shift bits in PPR one more place and insert "1" in MSB. Incorrect result (=−4). |

The last case to consider is the negative multiplier and negative multiplicand. This case combines the rules used for shifting negative partial products and the subtraction of the $n$th iteration of the multiplicand at the last partial add time. The difference is that at the final shift of the partial product, insertion of a zero is required into the most significant bit of the partial product register to give the correct sign since the result is positive.

EXAMPLE 5

| | | |
|---|---|---|
| 110 | | $M_d$ (−2). |
| 110 | | $M_r$ (−2). |
| 000 | 0 | Shift bits in PPR one place ("0" detected in first $M_r$ bit position). |
| 110 | | Add $M_d$ (examine "1" in second $M_r$ bit position). |
| 110 | 0 | Resulting partial product. |
| 111 | 00 | Shift bits in PPR one place and insert "1" in MSB position since a "1" was detected in the second $M_r$ bit position. |
| 110 | 00 | Subtract $M_d$ (last iteration). |
| 001 | 00 | Remainder. |
| 000 | 100 | Shift one more place and force "0" in MSB to indicate positive result. Correct result (=+4). |

As will be seen in the above example, the negative multiplicands are summed to form the partial products. Thus no "1" is inserted into the MSB of the partial product register until a "1" is detected in the multiplier. From that time on the "1" is maintained until the last iteration. The multiplicand is subtracted from the value in the partial product register of the last iteration and the result is shifted one place and a "0" forced into the MSB to indicate a positive result.

Consider now the operation of the circuit shown in FIG. 1 wherein 010 is multiplied times 110 or 2×(−2) as in example 3. The multiplicand, 010, is placed in the E-register 2 and the multiplier, 110, is placed in the rear portion 4 of the C-register shifted one place. Thus, the front portion 6 of the C-register stores 000 while the rear portion 4 of the C-register stores 011 and the extra stage $K+1$ stores 0 stored in front portion 6 of the C-register which opens AND-gate $A_1$. Now add "0" to the "0'"s stored in the B-register 8, the Partial Product Register (because of the "0" in the $k+1$ stage), shift one place and store in the front and rear portions 4 and 6 of the C-register. To accomplish this, take the contents of portions 6 and 4 of the C-register to the B and A-registers respectively and return to portions 6 and 4 of the C-register shifted one place. In the present example, the front portion 6 of the C-register now stores 000 while the rear portion 4 stores 001 and $K+1$ stores a "1," the center bit of 010, the first "1" to be detected in the multiplier. The "1" in the $K+1$ stage now opens AND-gate $A_2$ and closes AND-gate $A_1$. Now the contents of the front portion 6 of the C-register, 000, is added to the contents of E-register 2, 010, and transferred to B-register 8, which now equals 010. The contents of the rear portion 4 of the C-register is also transferred to A-register 10 and the contents of both the B and A-registers is transferred to the front and rear portions 6 and 4 respectively of the C-register shifted one place. The front portion 6 of the C-register now contains 001, the rear portion 4 contains 000 and stage $K+1=1$. This time, because the counter = $n$ and the multiplier is negative, AND-gate $A_3$ is enabled and the complement of the E-register 2 is gated to the Adder 12 to be added to the contents of the front portion 6 of the C-register along with a forced carry on line 14 and the result stored in the B-register 8. The contents of the rear portion of the C-register is transferred to the A-register 10. The contents of the B and A-register is shifted one place and returned to the respective front and rear portions 6 and 4 of the C-register. Thus, 101 ($\bar{E}$)+001 (C)=110++001 carry)=111. This value is shifted one place and stored in the C-register as 011 and 100 in the front and rear portions respectively. Since the bit sign injection to the C-register by the Control Circuit 16 is a "1," the result is 111100. This is the correct answer.

Figure 2:
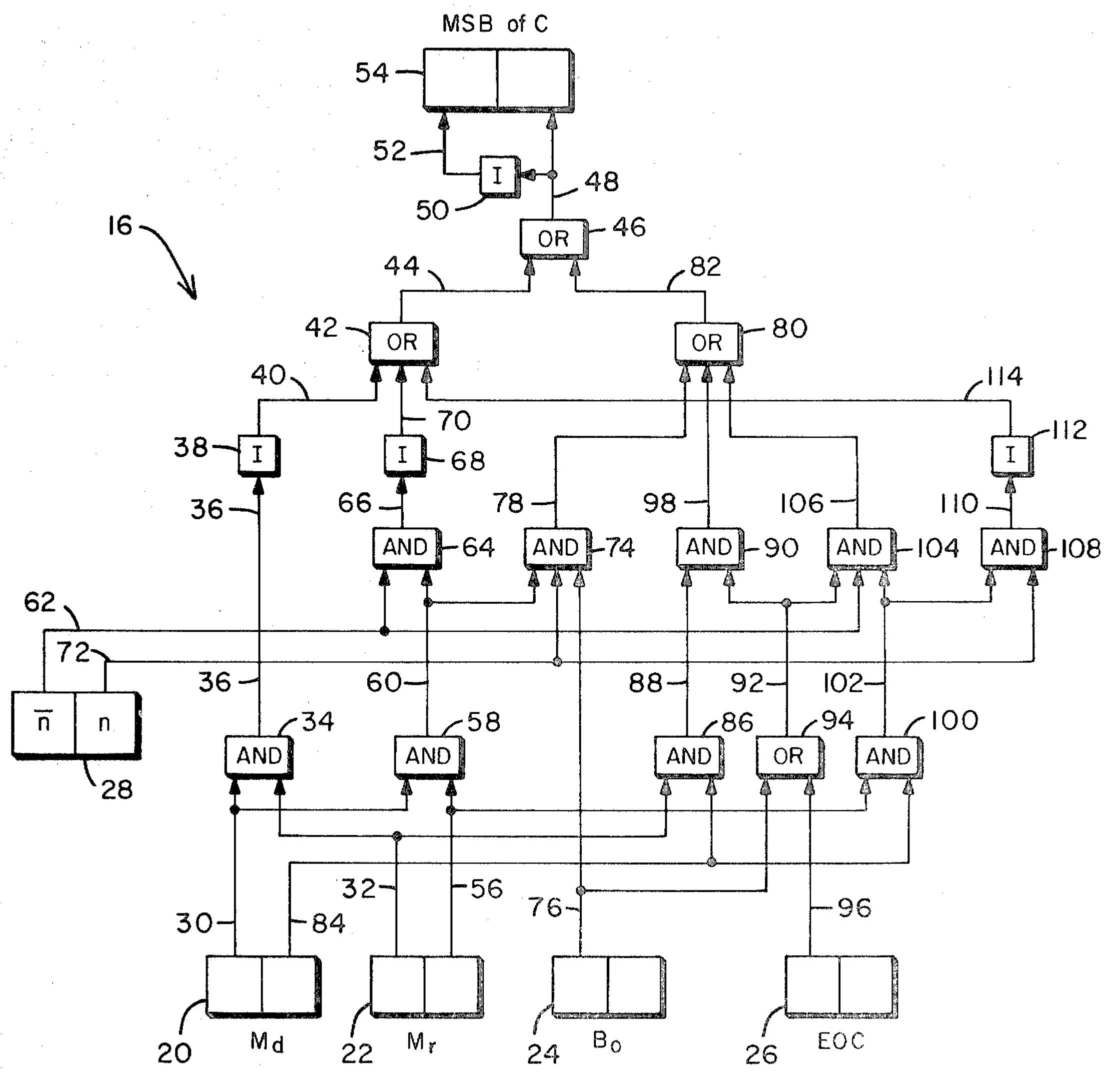
FIG. 2 discloses the details of the Control Circuit for bit sign injection in the C-register.

FIG. 2 discloses the details of the Control Circuit 16 which determines the bit sign injection into the most significant stage of the C-register. The circuit of FIG. 2 produces the results required by the truth table shown in FIG. 3. Flip-flops 20 and 22 represent the sign bit stage of the multiplicand and multiplier registers respectively. Flip-flop 24 represents the most significant bit stage of B-register 8, $B_o$, while flip-flop 26 represents the stage in Adder 12 which produces any end-off-carry (EOC). Flip-flop 28 represents the stage of an $n$-bit clock which produces a signal representing either that the clock has or has not counted $n$ pulses.

From the truth table shown in FIG. 3, it can be seen that a bit will be injected in the most significant stage of the C-register in FIG. 1, under four different conditions.

The first condition occurs with positive multiplicand and positive multipliers. Multiplication of positive operands is straight forward. The partial products formed always results in positive numbers. Therefore, the most significant bit of the partial product register B will always be zero. Thus the insertion of the sign bit into the C-register at shift time can unconditionally form the MSB of the C-register.

Thus, under these conditions it makes no difference whether or not the clock has counted $n$ pulses. In either case, a "0" is forced into the most significant stage of the C-register. FIG. 2 illustrates these conditions. If both the multiplicand and multiplier are positive, flip-flops 20 and 22 produce outputs on lines 30 and 32 respectively. These signals are coupled to AND-gate 34 which produces a "1" output on line 36. This output is coupled to Inverter 38 which produces a "0" output on line 40 that passes through OR-gate 42 on line 44 to OR-gate 46. OR-gate 46 produces a "0" output on line 48 which is inverted by Inverter 50 to cause a "1" on line 52 which "sets"

the "0" side of flip-flop 54, the most significant stage of the C-register. Thus, no matter what count is being produced by the clock from stage 28, if the multiplicand and the multiplier are both positive, a "0" is stored in stage 54, the most significant stage of the C-register. The first condition illustrated by the truth table shown in FIG. 3 is thus fulfilled by the circuit of FIG. 2.

The second condition occurs with positive multiplicands and negative multiplier. Recalling the rule for the negative multiplier, the last iteration always results in subtraction of the *n*th iteration of multiplicand from the final partial product. Since the shift of the final partial product occurs prior to the final subtract the result will always contain the proper sign of the result. The case in two's complement in which the multiplicand is zero results in a zero partial product prior to the subtract. Subtraction of zero from zero at the last iteration will unconditionally result in zero for this case. Whenever the partial product is nonzero at the last iteration, the subtraction process will unconditionally produce a "1" in the most significant bit of the result because of the shift prior to the subtract. Therefore, insertion of the MSB of the C-register at the last shift of the partial product will unconditionally produce the correct algebraic sign for the positive multiplicand, negative multiplier case.

The second condition is illustrated by the truth table in FIG. 3 when the multiplicand is positive and multiplier is negative. Under this condition the bit that will be injected into the most significant stage of the C-register depends upon the clock signal being produced by stage 28 of the clock shown in FIG. 2. If the clock is producing a signal $K \neq n$ then a "0" is forced into the most significant stage of the C-register. If the clock is producing a signal $K=n$, then the bit in the most significant stage of the B-register 8, $B_0$, is forced into the most significant stage of the C-register. This condition is illustrated in FIG. 2.

When the multiplicand is positive, flip-flop 20 produces a signal on line 30. When the multiplier is negative, flip-flop 22 produces a signal on line 56. The signals on lines 30 and 56 are coupled as enabling signals to AND-gate 58 which produces an output on line 60. This signal on line 60 and the signal on line 62 from clock flip-flop 28 representing $K \neq n$ are coupled as enabling signals to AND-gate 64. The signal on line 66 from AND-gate 64 is coupled to Inverter 68 which produces a "0" on line 70 which is coupled to OR-gate 42. As indicated in the discussion of the first condition, the signal from OR-gate 42 passes through OR-gate 46 on line 48 to Inverter 50 which produces a "1" on line 52 that "sets" the "0" side of flip-flop 54 the most significant stage of the C-register. Thus, when the multiplicand is positive and the multiplier is negative, the bit that is injected in the most significant stage of the C-register is a "0" if the clock is producing $K \neq n$. If the clock is producing the signal $K=n$ on line 72 when AND-gate 58 is producing an output on line 60, then AND-gate 64 is inhibited and AND-gate 74 receives the signals as enabling signals. AND-gate 74 also receives the bit stored in the most significant stage 24 of the B-register 8 on line 76. If this signal is a "1" on line 76, AND-gate 74 is enabled and produces a "1" signal on output line 78 which passes through OR-gate 80 on line 82 to OR-gate 46. OR-gate 46 passes the "1" signal to line 48 which is coupled to the "1" side of slip flop 54 and thus flip-flop 54 is set to a "1," the same as the most significant stage 24 of the B-register 8.

The third condition occurs with negative multiplicand and positive multipliers. Basically, this is the summation of negative numbers to form the partial product. For a nonzero positive multiplier digit either the end-off-carry or the result stored in the MSB of the B-register ($B_0$) at the final iteration, will contain a "1" because the multiplicand is negative. When the multiplier is zero, the partial product will always be zero, and an EOC can never occur. Therefore, insertion of $B_0$ + EOC at shift time of the partial product will unconditionally maintain the proper sign of the partial product regardless of the state of the bit under consideration in the multiplier.

The third condition is illustrated in the truth table shown in FIG. 3 when the multiplicand is negative and the multiplier is positive. Under this condition, it makes no difference whether or not the clock has counted *n* pulses. In either case, either the end-around-carry (EOC) from Adder 12 or $B_0$, the bit in the most significant stage of B-register 8, is forced into the most significant stage of the C-register. Consider now these conditions with respect to FIG. 2.

When the multiplicand is negative, flip-flop 20, the multiplicand sign bit stage, produces a "1" on line 84 which is coupled as an enable signal to AND-gate 86. Since the multiplier is positive, the sign bit on line 32 from flip-flop 22 is a "1" and is also coupled to AND-gate 86 as an enabling signal. AND-gate 86 then produces a signal on line 88 which is coupled to AND-gate 90 as an enabling signal. Also coupled to AND-gate 90 via line 92 is the output from OR-gate 94. The inputs to OR-gate 94 comprise the signal on line 71 from flip-flop 24 representing $B_0$ and the signal on line 96 from flip-flop 26 representing the end-around-carry, EOC, from Adder 12. Thus, if either or both $B_0$ or EOC is a "1," OR-gate 94 produces an output on line 92 which completes the enables for AND-gate 90 which produces a "1" on line 98 that is coupled to OR-gate 80 which produces a "1" signal on line 82 that is coupled to OR-gate 46. The output of OR-gate 46 on line 48 is a "1" which "sets" flip-flop 54, the most significant stage of the C-register, to a "1." It is obvious from FIG. 2 that if both $B_0$and EOC are "0's," then the outputs of flip-flops 24 and 26 on lines 76 and 96 respectively will be "0's" and AND-gate 90 will not be enabled. Under this condition, AND-gate 90 will produce a "0" on output line 98 which will be coupled through OR-gate 80 and 46 on lines 82 and 48 respectively. The "0" on line 48 is inverted by inverter 50 to produce a "1" on line 52 which "sets" flip-flop 54 to a "0" state. Thus, whether the clock is producing a pulse $K \neq n$ or $K=n$, if either $B_0$ or EOC is a "1," that value will be forced into the most significant stage 54 of the C-register. If both $B_0$ and EOC are "0's," then a "0" will be stored in stage 54.

The fourth condition occurs with negative multiplicands and negative multipliers. This case combines the rules used for shifting negative partial products and the subtraction of the $r^{nth}$ iteration of the multiplicand at the last partial add time. It must be remembered that at the final shift of the partial product, insertion of a zero into the most significant stage of the partial product register is required.

The fourth condition is illustrated in the truth table shown in FIG. 3, when both the multiplicand and multiplier are negative. Under this condition, if the clock is producing a pulse when $K \neq n$, then either the end-around-carry bit from Adder 12 or $B_0$, the bit in the most significant stage of B-register 8, is forced into the most significant stage of the C-register. If the clock is producing a pulse where $K=n$, then a "0" if forced into the most significant stage of C-register. FIG. 2 again illustrates these conditions.

When both the Multiplicand and the multiplier are negative, sign bit flip-flops 20 and 22 each produce a "1" signal on lines 84 and 56 respectively. These signals are coupled to AND-gate 100 as enabling signals and cause an output signal to be produced on line 102 which is coupled to AND-gate 104 as a first enable signal. Also coupled to AND-gate 104 is a second enable signal on line 62 from stage 28 of the clock representing $K \neq n$. Finally, coupled to AND-gate 104 is the signal on line 92 from OR-gate 94 which represents either $B_0$ or EOC from flip-flops 24 and 26 respectively. If either $B_0$ or EOC is a "1," AND-gate 104 is enabled and a "1" is produced on output line 106. This signal is coupled to and passes through OR-gate 80 on line 82 and OR-gate 46 on line 48. This signal on line 48 "-sets" flip-flop 54, the most significant stage of the C-register, to a "1" state. Thus, if either $B_0$ or EOC is a "1" under the stated conditions, this value, "1," is forced into flip-flop 54. It is obvious that if neither $B_0$ nor EOC is a "1," then AND-gate 104 is not enabled and thus a "0" is produced on line 106. This "0" is coupled to and passes through OR-gate 80 on line 82 and OR-gate 46 on line 58. Inverter 50 receives the "0"

signal on line 48 and produces a"1" on line 52 which "sets" the "0" side of flip-flop 54 thus storing a "0" in the most significant stage of the C-register 6.

If, under the conditions where both the multiplicand and multiplier are negative, the clock is producing signal $K=n$ on line 72, the circuit operates as follows. Under these conditions, the clock signal on line 72 is coupled as one enabling signal to AND-gate 108. Also coupled as an enabling signal to AND-gate 108 is the signal on line 102 from AND-gate 100 which represents that both the multiplicand and multiplier are negative. AND-gate 108 then produces a "1" output on line 110 which is coupled to Inverter 112. A "0" is produced on line 114 by Inverter 112 and is coupled to OR-gate 42. This signal passes through OR-gate 42 on line 44 and OR-gate 46 on line 48. Inverter 50 receives the signal on line 48 and produces a "1" on line 52 which "sets" the "0" side of flip-flop 54 and thus stores a "0" in the most significant stage of C-register.

The circuit shown in FIG. 2 is in fact the Control Circuit 16 shown in FIG. 1 and operates to inject a bit in the most significant stage of the C-register according to the truth table shown in FIG. 3.

Thus a novel two's complement negative number multiplying circuit has been disclosed which utilizes a single-length Adder to perform the same function as would be required with a double-length Adder in the prior art. Further, no "special" conditions occur which must be detected as in the prior art and thus both time and money are saved.

It is understood that suitable modifications may be made in the structure as disclosed provided such modifications come within the spirit and scope of the appended claims.

Having, now, therefore, fully illustrated and described my invention, what I claim to be new and desire to protect by Letter Patent is:

1. A method of multiplying a two's complement negative binary number multiplicand and a positive binary multiplier comprising the steps of:

a. sequentially examining the bits in the stages of the multiplier register for a "1" or a "0,"
b. shifting the bits in the partial product register one place each time a "0" is detected in the multiplier bit position being examined,
c. adding the multiplicand to the value in the partial product register and shifting the result one place whenever a "1" is detected in the multiplier bit position being examined,
d. injecting a "1" in the most significant bit position of the result of said add and shift in step (c), and
e. maintaining the "1" in the most significant bit position thereafter while repeating steps (b) and (c) until the bit in each stage of the multiplier has been examined.

2. A method of multiplying a positive binary multiplicand and a two's complement negative binary number multiplier comprising the steps of:

a. sequentially examining the bits in the stages of the multiplier register for a "1" or a "0,"
b. shifting the bits in the partial product register one place each time a "0" is detected in the multiplier bit position being examined,
c. adding the multiplicand to the value in the partial product register and shifting the result one place whenever a "1" is detected in the multiplier bit position being examined,
d. repeating steps (b) and (c) until the last bit in the multiplier register is examined, and
e. subtracting the multiplicand from the result in the partial product register, shifting the remainder one place and injecting a "1" into the most significant bit position to indicate a negative product.

3. A method of multiplying both a two's complement negative binary number multiplicand and multiplier comprising the steps of:

a. sequentially examining the bits in the stages of the multiplier register for a "1" or a "0,"
b. shifting the bits in the partial product register one place each time a "0" is detected in the multiplier bit position being examined,
c. adding the multiplicand to the value in the partial product register and shifting the result one place each time a "1" is detected in the multiplier bit position being examined,
d. injecting a "1" in the most significant bit position of the result of said add and shift in step (c),
e. maintaining the "1" in the most significant bit position while repeating steps (b) and (c) until the last bit in the multiplier is examined, and
f. subtracting the multiplicand from the result in the partial product register, shifting the remainder one place and forcing a "0" into the most significant bit position to indicate a positive product.

* * * * *